United States Patent [19]

Rainbow

[11] 4,404,013

[45] Sep. 13, 1983

[54] PLANT GROWTH MEDIUM

[75] Inventor: Arnold Rainbow, Ipswich, England

[73] Assignee: Fisons Limited, England

[21] Appl. No.: 368,008

[22] Filed: Apr. 13, 1982

Related U.S. Application Data

[63] Continuation of Ser. No. 167,685, Jul. 11, 1980, abandoned.

[30] Foreign Application Priority Data

Jul. 17, 1979 [GB] United Kingdom ................. 7924910

[51] Int. Cl.³ .............................................. C05F 11/02
[52] U.S. Cl. ....................................... 71/24; 252/351; 44/32
[58] Field of Search ...................... 71/24, 64.7; 44/27, 44/32; 252/351, 352; 568/608, 648, 716; 260/512 R, 512 C

[56] References Cited

U.S. PATENT DOCUMENTS

2,170,644 8/1939 Nelson ................................. 252/351
4,174,957 11/1979 Webb et al. ............................. 71/24

FOREIGN PATENT DOCUMENTS

2548851 5/1976 Fed. Rep. of Germany .......... 71/24
1420522 1/1976 United Kingdom .................... 71/24

OTHER PUBLICATIONS

Schwartz et al.; Surface Active Agents or Detergents, vol. II, 1958, Interscience Publishers, Inc., N.Y., pp. 121, 122, 125.

*Primary Examiner*—Ferris H. Lander
*Attorney, Agent, or Firm*—Merriam, Marshall & Bicknell

[57] ABSTRACT

A composition comprising peat and a wetting agent characterized in that the wetting agent is an alkylene oxide condensate of a tri-(alkyl)substituted phenol or an ester thereof.

5 Claims, No Drawings

PLANT GROWTH MEDIUM

This is a continuation, of application Ser. No. 167,685, filed July 11, 1980, and now abandoned.

The present invention relates to a composition containing peat, notably one containing peat and certain wetting agents.

It has been proposed to incorporate certain types of non-ionic and anionic wetting agents into plant growth medium compositions comprising peat in order to assist wetting up of the peat with water. Specifically, our British Pat. No. 1,420,522 describes and claims the use of the sulphate esters of mono- or di-alkyl phenol/alkylene oxide condensates. Surprisingly, we have now found that tri-(alkyl) substituted phenol/alkylene oxide condensates are particularly effective in aiding wetting up of peat.

Accordingly, the present invention provides a composition comprising peat and an alkylene oxide condensate of a tri(alkyl) substituted phenol or a salt or ester thereof.

Preferred condensates for present use have the formula:

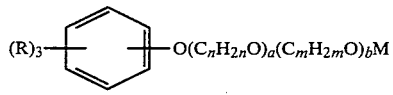

wherein each R may be the same or different and is an alkyl group containing from 1 to 12 carbon atoms; n and m may be the same or different and each has a value of 2 or 3; a and b have values of 0 or 1 or more and the sum of a+b is at least 1; and M is hydrogen, ammonium or an alkali metal; or mineral acid esters thereof.

The group R is a straight or branched alkyl group and preferably contains less than 8, e.g. 2 to 6, carbon atoms. Thus, each R can be an ethyl, propyl, isopropyl, butyl or tertiary butyl group.

It will be appreciated that the condensates for present use may exist in the commercially available material as a mixture of condensates. The values given herein for a and b are therefore mean values. It is preferred that the trialkyl phenol be condensed with from 4 to 20, notably 6 to 10, molar proportions of ethylene and/or propylene oxide.

The condensates of formula I may be used as such. However, it is preferred to use them in the form of esters thereof with a mineral acid, notably as a mono sulphate or monophosphate ester or salts of such esters. Preferred sulphate esters for present use have the general formula:

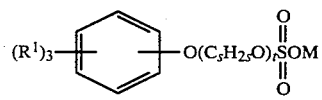

wherein $R^1$ is an alkyl group containing from 1 to 4 carbon atoms, t has an average value of at least 1, preferably not more than 20, notably from 6 to 10; M represents hydrogen, an alkali-metal, notably sodium or potassium, or ammonium cation; and s has a value of 2 or 3.

The condensates of formula I and the esters thereof for present use are known compounds or may be readily produced from known compounds using known techniques, and may be used in their commercially available forms without purification.

The peat for present use may be a sedge or sphagnum peat and is preferably a comminuted peat, notably one in which substantially 100% of the particles pass through a 9.5 mm sieve aperture. The comminuted peat will usually have a moisture content of from 55 to 90% based on the total weight of water plus dry peat solids. However, peat with a lower water content may be used if desired, notably when the treated peat is to be compressed into bales, discs or briquettes. The peat may be a blend of peats.

Where the peat is to be used in making a compost, it is preferred to use a peat or blend of peats which has been comminuted and has the overall characteristics described in our British Pat. No. 1,420,522.

The compositions of the invention may contain a wide range of proportions of peat to condensate or ester. However, we prefer to use less than 2% by weight of the condensate or ester based on the weight of dry peat solids, e.g. 0.01 to 1%, preferably 0.05 to 1%, by weight.

In addition to the peat and the condensate or ester, the compositions of the invention usually contain one or more fertilizer ingredients. These include such compounds as the ammonium and potassium salts of phosphoric, sulphuric and nitric acids; superphosphates; potassium hydroxide or chloride; urea and slow release fertilizer compounds, notably ureaformaldehyde resins. Part or all of the desired nitrogen fertilizer component may be introduced into the past by ammoniation of the peat. Trace element metal salts, e.g. copper sulphate ferrous sulphate, sodium molybdate and calcium tetraborate, can also be present.

It is preferred to incorporate calcium and/or magnesium carbonate, e.g. in the form of ground chalk or dolomitic limestone, into the mixture in order to raise the pH value of the composition, e.g. to a value of from 5 to 8.

The fertilizer ingredients, which is this context includes the calcium and/or magnesium carbonate, are present in any suitable amount. However, this will usually be less than 30% by weight of the dry peat solids, e.g. about 18% for a seedling compost and about 25% for a potting compost.

It is preferred that the compositions of the invention be substantially sand and soil free, although some, e.g. up to 15% by volume, sand or other carrier medium such as vermiculite, perlite or a foamed synthetic resin, may be present, since it will usually be desirable to have a bulking or carrying medium present in the fertilizer ingredients in order to assist their admixture with the bulk of the peat.

The compositions of the invention, whilst appearing comparatively dry and free flowing, usually contain an appreciable weight of water when prepared for use. Thus, water is usually present in from 50–70%, preferably 55–67%, by weight of the total weight of dry peat solids and water. However, it will be appreciated that not all this water need be present in the composition as manufactured, but that a composition containing say as little as 15% by weight of water may be made and sold, e.g. as a compressed bale, disc or briquette. Water being added to raise the water content of the composition to the desired level before use.

The compositions of the invention can be prepared merely by mixing the various ingredients together. It will usually be preferred to dissolve the condensate or ester in part of the water required for the composition and to add this solution to the comminuted peat before the other ingredients are added as dry solids, optionally in admixture with a carrier such as sand. However, if desired the condensate or ester is incorporated after the other ingredients have been mixed together. Alternatively, the condensate or ester is mixed with the fertilizer ingredients, when used, and this mixture then added to the peat. Where the composition is to be compressed, it will usually be necessary that the composition has a water content of 30% or less. Drying of the peat before, during or after mixing may therefore be necessary.

The invention will now be illustrated by the following Examples, in which all parts and percentages are given by weight unless otherwise stated:

EXAMPLE 1

A peat based compost was prepared from a milled sphagnum peat having a dry weight of 0.075 g/ml, a water absorption of 6.7 g/g dry peat solids, a screen analysis of 100% passing a 9.5 mm sieve and 15% by weight being retained by a 6.325 mm sieve, and a compressibility of 1.3:1. The compost was then allowed to dry out at room temperature for 30 days. The wettability of the peat was then assessed by measuring the volume of water taken up in 5 minutes by the compost when the pot was stood in 500 ml dish containing 100 mls of distilled water.

In one series of pots the compost contained no wetting agent and in other series of pots the composts contained a variety of wetting agents which had been incorporated into the compost by spraying an aqueous solution of the wetting agent onto the compost and mixing it in.

The wetting agents were:
Test A: sodium salt of the sulphate mono-ester of a monononylphenol/ethylene oxide condensate.
Test B: sodium salt of the sulphate mono-ester of triisobutyl-phenol/ethylene oxide condensate.

The results of these tests are set out below.

| Test | Dosage rate % w/w | Mls of water taken up in 5 minutes |
| --- | --- | --- |
| No wetting agent | 0 | 2 |
| A | 0.035 | 8 |
|  | 0.14 | 30 |
|  | 0.56 | 100 |
| B | 0.035 | 31 |
|  | 0.14 | 100 |
|  | 0.56 | 100 |

EXAMPLE 2

A potting compost was prepared from a milled sedge peat having a sieve analysis of 100% passing a 9.5 mm sieve, a moisture content of 60% w/w and dry weight of 140 g/liter. The peat was blended with 10 g/liter of fertilizer and lime additives to provide 0.25 g/l. N, 0.59 g/l. P$_2$O$_5$ and 0.823 g/l. K$_2$O in the compost. The compost was divided into four equal portions. The wetting agents used in Tests A, D and C of Example 1 were diluted in water and each was applied at different levels to samples of the three portions of compost via a spray bar and blended thoroughly into the compost. The fourth portion was treated with an equivalent volume of water and served as an experimental control.

The samples were packed in closed plastic sacks, stacked and stored.

Samples were taken after 3 months and 7 months storage and tested for wettability as follows:

A 89 mm plastic pot was filled to the shoulder with compost and stood in a 600 ml glass dish. 100 ml of water was poured evenly over the surface of the compost. One minute after the start of the test any unabsorbed water was transferred to a measuring cylinder and the volume collected was substracted from 100 ml to give the volume absorbed.

The results were as follows:

| | | Mls of water absorbed in 1 minute | |
| --- | --- | --- | --- |
| Test | Dosage rate % w/w* | 3 months storage 1 | 7 months storage 2 |
| No wetting agent | 0 | 26 | 22 |
| B | 0.10 | 71 | 42 |
|  | 0.13 | 81 | 49 |
|  | 0.20 | 100 | 55 |
|  | 0.27 | 100 | 53 |
|  | 0.30 | 100 | 67 |
|  | 0.40 | 100 | 62 |

*as % of dry peat solids
1 tested 60% w/w moisture content
2 tested 45% w/w moisture content

EXAMPLE 3

Composts were prepared as in Example 1 using a number of different wetting agents and the wettability of the resulting composts was assessed as in Example 2 one week after preparing the composts. The results were as follows:

| Wetting Agent | Amount used % w/w w/w on dry peat solid | Mls of water taken up in 1 minute |
| --- | --- | --- |
| Tri(butyl) substituted phenol condensate with ethylene oxide monosulphate ester. | 0.096 | 82 |
| Tri(butyl) substituted phenol condensate with ethylene oxide. | 0.096 | 65 |
| Mono nonyl phenol condensate with ethylene oxide mono sulphate ester | 0.096 | 40 |
| None | — | 28 |

I claim:

1. A composition comprising peat and 0.01 to 2% by weight, based on the dry peat solids, of a wetting agent having the formula:

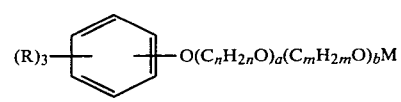

I wherein each R is selected from an alkyl group containing from 1 to 12 carbon atoms; n and m each has a value selected from 2 and 3; the sum a+b is at least 1 and at least one of a and b has a value of at least 1; and M is selected from hydrogen, ammonium and alkali metal; and mineral acid esters thereof.

2. A composition as claimed in claim 1 containing more than 0.05% by weight of said wetting agent.

3. A composition as claimed in claim 1 wherein the group R is an alkyl group which may optionally be branched and contains from 2 to 6 carbon atoms.

4. A composition as claimed in claim 1 wherein the wetting agent is a monosulphate ester, a monophosphate ester or an alkali metal salt of such an ester.

5. A composition as claimed in claim 1 wherein the wetting agent has the general formula:

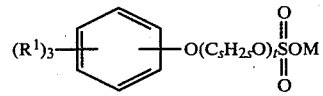

wherein $R^1$ is an alkyl group containing from 1 to 4 carbon atoms, t has an average value of from 6 to 10; M is selected from hydrogen, sodium, potassium and ammonium; and s has a value selected from 2 and 3.

* * * * *

UNITED STATES PATENT AND TRADEMARK OFFICE
CERTIFICATE OF CORRECTION

PATENT NO. : 4,404,013
DATED : September 13, 1983
INVENTOR(S) : ARNOLD RAINBOW

It is certified that error appears in the above-identified patent and that said Letters Patent are hereby corrected as shown below:

Column 2, line 31, "past" should be --peat--.

Signed and Sealed this

Tenth Day of January 1984

[SEAL]

Attest:

GERALD J. MOSSINGHOFF

Attesting Officer　　Commissioner of Patents and Trademarks